G. A. WIKANDER.
ELECTROMAGNETIC DEVICE FOR OPERATING TYPE WRITERS.
APPLICATION FILED OCT. 18, 1910.

1,067,566.

Patented July 15, 1913.

WITNESSES:
O. Martin.
C. B. Long.

INVENTOR
Gustavus A. Wikander
BY T. Geisler
ATTORNEY

G. A. WIKANDER.
ELECTROMAGNETIC DEVICE FOR OPERATING TYPE WRITERS.
APPLICATION FILED OCT. 18, 1910.

1,067,566.

Patented July 15, 1913.

WITNESSES:
O. Martin
C. B. Long

INVENTOR
Gustavus A. Wikander.
BY T. J. Geisler
ATTORNEY

Fig. 5.

G. A. WIKANDER.
ELECTROMAGNETIC DEVICE FOR OPERATING TYPE WRITERS.
APPLICATION FILED OCT. 18, 1910.

1,067,566.

Patented July 15, 1913.

WITNESSES:
O. Martin
C. B. Long

INVENTOR
Gustavus A. Wikander
BY
ATTORNEY

UNITED STATES PATENT OFFICE.

GUSTAVUS A. WIKANDER, OF PORTLAND, OREGON.

ELECTROMAGNETIC DEVICE FOR OPERATING TYPE-WRITERS.

1,067,566.　　　　　Specification of Letters Patent.　　Patented July 15, 1913.

Application filed October 18, 1910. Serial No. 587,766.

*To all whom it may concern:*

Be it known that I, GUSTAVUS A. WIKANDER, a citizen of the United States, and a resident of Portland, in the county of Multnomah and State of Oregon, have invented a new and useful Improvement in Electromagnetic Devices for Operating Type-Writers, of which the following is a specification.

This invention, has for its object to further improve the electro-magnetic device heretofore invented by me, and for which I filed an application for Letters Patent of the United States January 18, 1908, No. 411,532, said device being intended for use in connection with a typewriter or other key-actuated instrument, for the purpose of reducing the muscular exertion required to be expended in the operation of such instrument, and at the same time insuring uniformity in the impressions of the type; and what I purpose to accomplish by my present invention is: to so arrange the operating parts that the device may be worked at the highest speed without danger of any of the component parts of my device interfering with each other; also to obtain a device in which strength and flexibility are combined to produce a very rapid action, with no danger of straining or otherwise injuring the working parts of my device.

My invention furthermore includes the special features hereinafter set forth.

In the accompanying drawings, constituting a part hereof: In Fig. 4 devices are shown comprising a single element for establishing electric contact, which element is adapted to be operated by the depression of the keys in any of the banks, while in the devices shown in Fig. 7 each bank of keys is provided with individual means for establishing such electric contact.

My device is mounted on a base, $a$, to which are secured perpendicular frame-sides $b$, $c$. In the frame-sides, $b$, $c$, is mounted a series of rock-shafts, $d$, $e$, $f$, $g$, $h$, and rigid on these shafts are two sets of bell-cranks, $i$, $j$, respectively, placed in close proximity to the inside faces of the frame-sides $b$, $c$. The bell-cranks are operatively connected together respectively by bars $k$, $l$. The shaft $h$ extends outside the frame-side $b$ and is rotatably supported at its end by a column $m$ on the base $a$. A two-armed lever $n$ is rigidly secured on said extension of the shaft $h$, and to one extremity of said lever is attached a spring $o$, which, being fixed to the base $a$, normally holds the lever $n$ against an adjustable stop $q$. The bell-cranks, $i$, $j$, are made with horizontal arms $r$, $s$, and in the outer ends of the latter are pivoted cross-bars $t$, by pivots $t'$. See Fig. 7. Suitable springs, $u$, hold these cross-bars against the shoulders $v$, $w$ of the arms $r$, $s$.

On the outer extremity of the lever, $n$, is pivoted a bell-crank $z$, one end of which is operatively connected with the plunger $y$ of a solenoid magnet $x$ by a bar 2. The bell-crank $z$ is provided with an adjustable stop 4, and an expansion spring 5 holds said stop 4 on the lever $n$.

When the magnet $x$ is energized the lever $n$ is first tilted until it rests on the stop 8, and any further motion of the plunger $y$ is taken up by bell-crank $z$ compressing the spring 5.

The flexible connection between the plunger of the magnet and the lever $n$ is of great importance. If an object accidentally drops into the machine, and blocks the downward motion of the parts actuated by a finger-key, then the plunger of the magnet, being unable to tilt the lever $n$, rocks the bell-crank $z$ independent of said lever, thus preventing injury to said obstructed parts.

Directly above the shafts $d$, $e$, $f$, $g$, $h$ is mounted a corresponding series of stationary rods 10, on which fulcrum key-levers 11, made with pendent arms 12, the lower ends of which are curved so as to fit the shafts $d$, $e$, $f$, $g$, $h$. On said shafts $d$, $e$, $f$, $g$, $h$ are pivoted bifurcated fingers 13, the lower extremities of which rest on the keys 14 of the typewriter while the bifurcated ends of said fingers 13 straddle said arms 12 of the keys 11.

Bolts 15 are slidably mounted in the fingers 13 and are normally held against the arms 12 of the keys 11 by expansion springs 16, one end of which bears against the nuts $15^a$ on the bolts 15. The keys 11 and fingers 13 are held in alinement and against lateral displacement by collars 19, rigidly secured on the shafts $d$, $e$, $f$, $g$, $h$.

When a key 11 is depressed its pendent arm 12 projects said bolt 15, of the related finger 13, into the path of a cross-bar $t$, and as the magnet $x$ is simultaneously energized, said cross-bar is forced down, carrying with it said finger 13, which in its turn actuates the type-bar mechanism of the typewriter.

Figure 5:
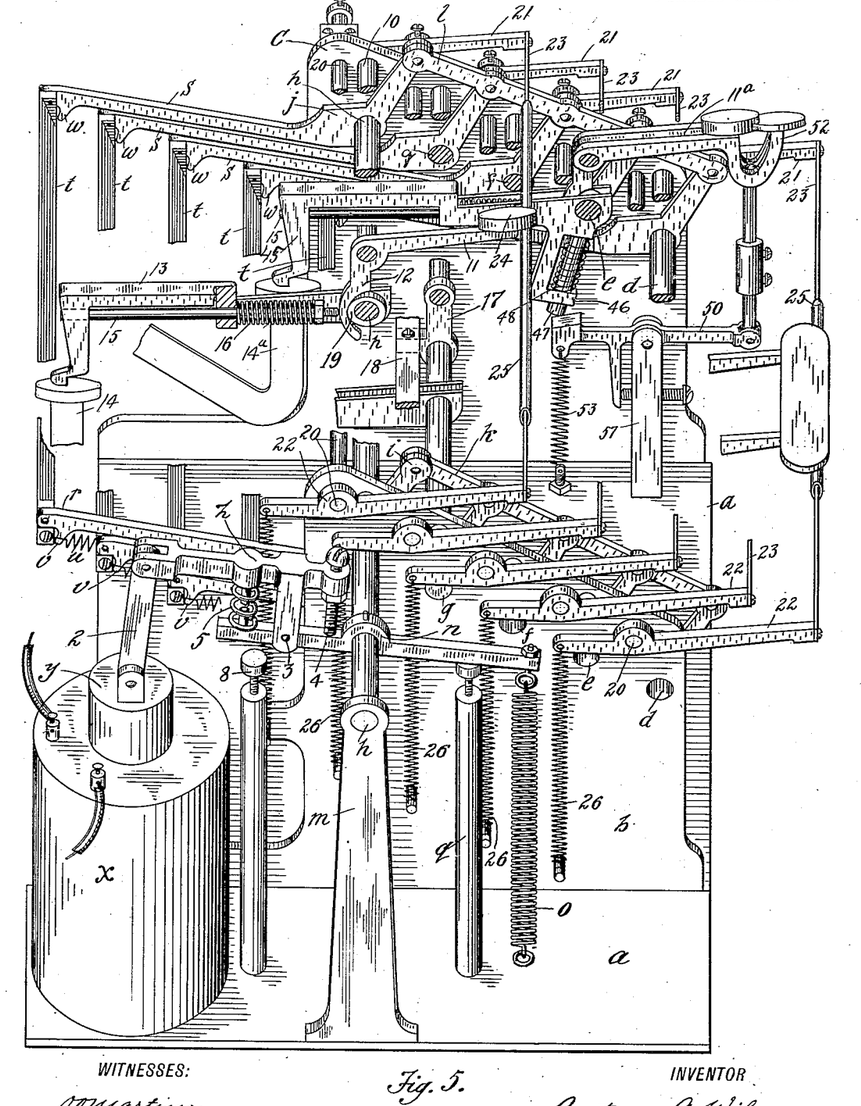
Fig. 5 is a partial left-end perspective elevation showing the magnet mechanism mounted outside the frame of my device, and as much of the inside mechanism as convenient in order to illustrate the relative positions of the parts of my device.
Figure 6:
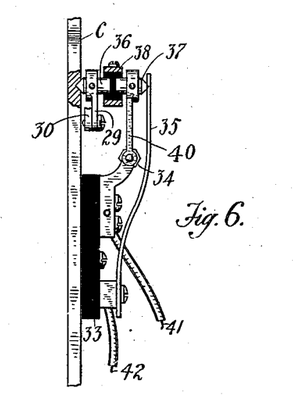
Fig. 6 is a front elevation of the electrical contact mechanism shown in Fig. 4.

To prevent the shafts $d$, $e$, $f$, $g$, $h$ and the rods 10 from bending under the working strain a suitable number of stiffening members, 17, are provided, as illustrated in Fig. 5. To the stiffening members 17 are secured cross-bars 18, which serve as stops for the fingers 13. Without such stop it might happen that the momentum acquired by a finger, 13, in its return movement, would lift it so high as to bring its bolt 15 above its related cross-bar, rendering such finger inoperative for the time.

As already mentioned, the cross-bars $t$ are pivoted to the arms $r$, $s$. The importance of this construction is realized by referring to Fig. 2. Suppose two keys, 11, of the same row, of my device, are operated in rapid succession, and that the bolt 15 of the related finger 13 of the second operated key is projected before the cross-bars $t$ of the arms $r$, $s$, have returned to their normal, up position, then the cross-bars $t$, in their return movement will tilt on its pivots and slip by such second projected bolt, and become positioned ready to act again.

Journaled in the frame-sides, $b$, $c$, and in close proximity to the rods 10, is a corresponding series of rock-shafts 20, and to the ends of these shafts are secured levers 21, 22, connected by a series of cross-bars 23, which bear against the bottom of the key-disks 24. The bars 23 may be covered with sleeves 25, to prevent any noise being occasioned by the contact of said parts.

Between the levers 22 on the outside of the frame-side, $b$, I suspend suitable springs 26, which hold the cross-bars 23 in and return them to their normal position. The cross-bars 23, secured by said levers 22, 21 to shafts 20, form a series of universal bails, one for each bank of key-levers, and these universal bails control the electrical contacts described below. To the right-hand ends of said shafts 20 (see Fig. 4) are adjustably fixed a series of arms 27, and on the frame-side $c$ are pivoted arms 28, 29, supporting a bar 30, provided with a series of projections 31; and a spring 32 is arranged to pull on the bar 30, so as to cause said projections to bear against the lower ends of the arms 27.

To the frame-side $c$ is secured a plate 33, made of insulating material and serving as an insulating base for an adjustable contact pin 34, and a stiff leaf-spring 35. Between the upper end of the spring 35 and the frame-side $c$ is hung a divided pivot comprising two members 36, 37, clamped together, electrically insulated from each other, by a clamp 38. The arm 29 is rigidly secured to the pivot member 36, and to the pivot member 37 is affixed a contact arm 40. Insulated wires 41, 42 connect the contacts with the solenoid magnet and the source of electrical power.

The operation of my device is as follows: The operator depresses a key lever 11, projecting the bolt 15 of the respective finger-piece 13 in the path of a cross-bar $t$. As universal bail 23 is carried down by the key lever, its arm 27 moves the bar 30 forward and thus closes the circuit on the contacts 34, 40, whereby the magnet $x$ is instantly energized, tilting the lever $n$ and forcing the cross-bars $t$ down, and as a cross-bar $t$ catches said projected bolt 15, said finger-piece 13 is brought down rapidly, carrying with it a typewriter key 14, and the typebar to the platen. The moment the operator lets go of the key lever, the circuit is broken and all parts are restored to their normal position.

Figure 7:
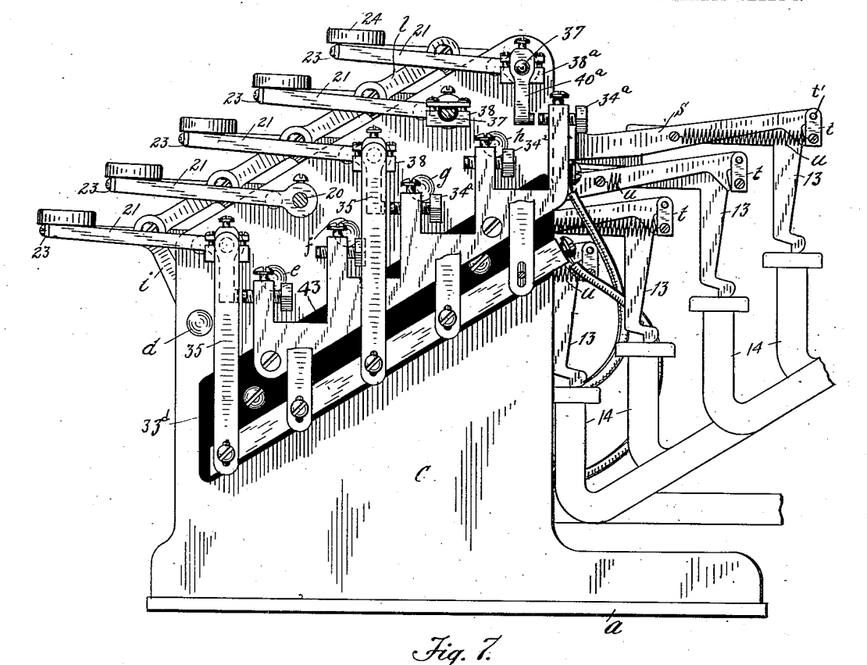
Fig. 7 illustrates a modified form of the mechanism provided for establishing electric contact by the depression of the keys.

Referring now to Fig. 7, it is noticed that an individual contact is provided for each bank of keys, the contact arms $40^a$ are secured directly to the ends of the shafts 20 by means of the insulating clamps $38^a$ and a corresponding series of contacts $34^a$ are mounted on a suitable insulated base $33^a$.

Figure 1:
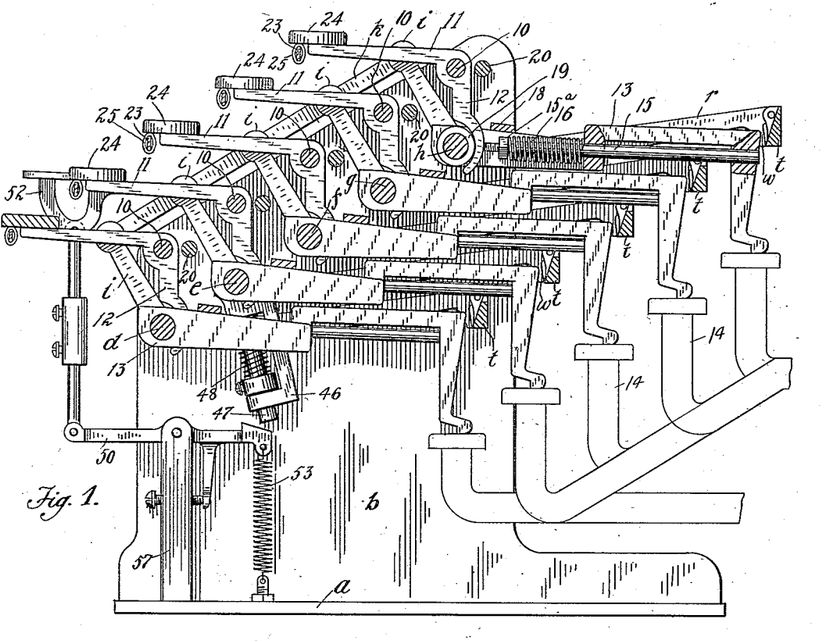
Figure 1 is a sectional elevation of my device showing the key levers, space bar, and shift mechanism at rest.
Figures 2, 3, 10:
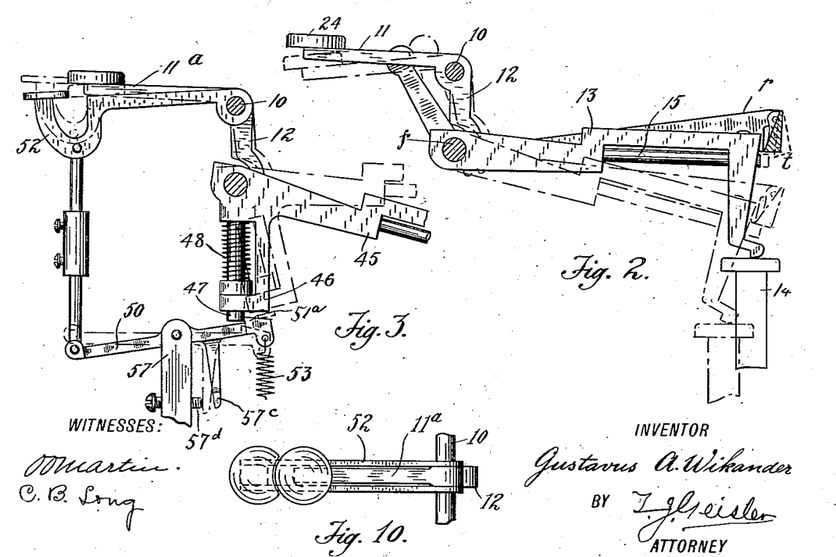
Fig. 2 illustrates the mechanism and operation of one of the key levers.
Fig. 3 illustrates the mechanism and operation of the shift key.
Fig. 10 is a partial top view of the parts shown in Fig. 3.

The operation of the shift mechanism illustrated in Figs. 1 and 5 is brought out more clearly in Fig. 3. The shift key $11^a$ is one of the series of key levers 11, and coöperates with a finger 45, like fingers 13, except that it has an integral pendent member 46, in which is lodged a shouldered sliding stem 47, controlled by a spring 48. The finger 45 bears on the shift key 14ª of the typewriter.

An auxiliary key lever 52 straddles the key lever 11ª and is connected with a lock lever 50, journaled in a post 57 on the base a. When the key 11ª is depressed the circuit is closed and the finger 45 moves down and actuates the typewriter shift mechanism. The shoulder 51ª engages bolt 47.

In order to print in the upper case, it is necessary to hold the finger 45 down and at the same time to release the key lever 11ª and thus break the circuit. The operator lets his finger slide from the key-disk of the key-lever 11ª onto the key-disk of the auxiliary lever 52 and tilts the lock lever 50, which holds the finger 45 locked until operator lets go of the key 52. In case the operator accidentally depresses both keys simultaneously, then the sliding stem 47 yields and compresses the spring 48 in passing over the stop projection of the stop lever 50, and having passed over said projection, said spring instantly forces the sliding stem down into locking position.

Figures 8, 11:
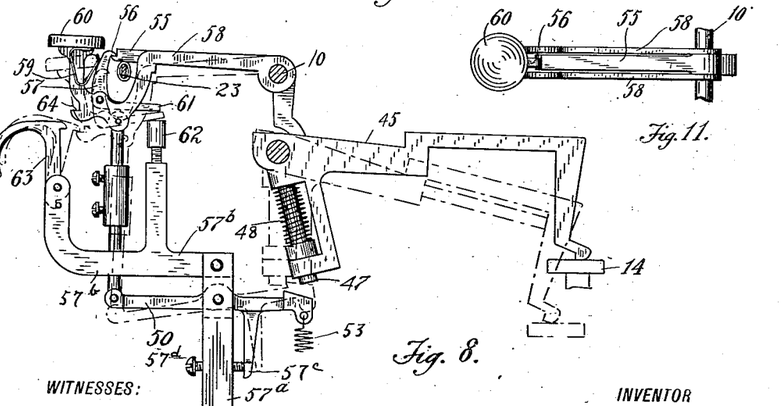
Fig. 8 shows a modified form of the shift mechanism.
Fig. 11 is a partial top view of the parts shown in Fig. 8.

In Fig. 8 is shown a modification of the shift mechanism. In this case a lever 55 takes the place of the key lever 11ª. Said lever 55 is provided with a notch 56 in its end, adapted to be engaged by the head of a pawl 57, pivoted on the shift lever 58. A suitable spring 59 holds the pawl 57 locked to the lever 55, so that when the shift key 60 is depressed the lever 55 follows until the trip arm 61 of the pawl 57 strikes a stop 62, which trips the pawl, and permits the lever 55 to return. The mechanism for locking the finger 45 down is identical with the one already described. The post 57ª is like the post 57 but carries a bracket 57ᵇ, in which the stop 62 is mounted. When desired to lock the finger 45 for a time, as when printing a clause in the upper case letters, the shift-lock-key 63 is caused to engage with a projection on the bottom of the shift-key 58. 57ᶜ and 57ᵈ limit the pull of spring 53.

Figure 4:
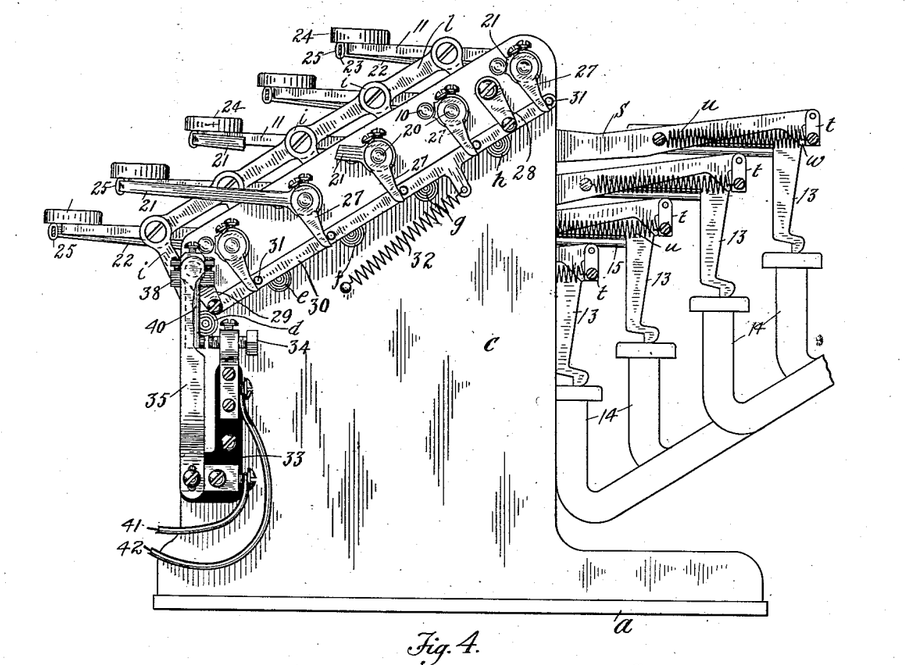
Fig. 4 is a right-end elevation of my device, showing the electrical contact means mounted outside the frame.

In Fig. 4 I have shown how I use a single make-and-break, for the whole device, said means furthermore arranged to be readily accessible.

As well known, the quicker the current is broken the less the spark on the contact points.

To insure a very rapid interruption of the circuit, the make-and-break may be accomplished by separate agencies. The making of the circuit may be accomplished as shown in Fig. 4 or 7, or indeed as shown in my said former application. To break the contact, the modification illustrated in Fig. 9 may be used, which is arranged as follows: To the magnet x is secured a bracket 66, made of insulating material, and on this is mounted a standard 67, from which is suspended an oscillating arm 68, carrying a contact member 69. A post 70, also mounted on the bracket 66, carries the other contact member 71. A spring 72 holds the contact member 69 in its normal, closed position. Mounted on, and insulated from the plunger y is a post 73, to which is secured a set-screw constituting a kick-off 74. Thus when the circuit is closed and the magnet is energized, pulling down its plunger, the kick-off strikes the member 75, pivoted on the arm 68, moves the latter out of the way and instantly breaks the circuit. The member 75 is controlled by a stop 76, so that the downward movement of the plunger y will kick the arm 68 out of the way, while in its return movement the foot of the set-screw 74 will tilt the member 75 out of the way.

As well known, in operating a typewriting machine, the initial blow on the finger key starts the typebar toward the platen, and its momentum carries it the remaining distance. It is therefore possible to adjust the kick-off 74 so as to act before the stroke of the magnet plunger is completed.

Figure 9:
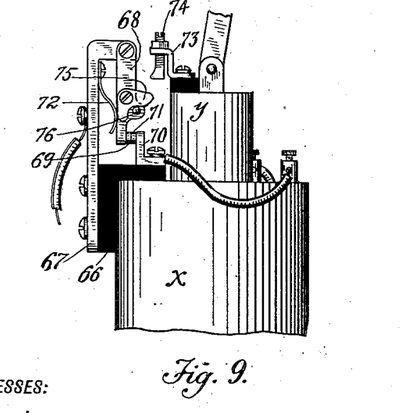
Fig. 9 shows means for utilizing the action of the magnet to break the circuit.

In the device illustrated in Fig. 9 the contacts 69, 71 and their supports and connections constitute, as apparent, a type of switch normally closed, and opened as described, and for convenience will be so referred to in the claims.

I claim:

1. In a device of the character described, the combination of a frame, a series of rockable shafts journaled therein; a bank of keys pivoted in the frame; a corresponding series of fingers provided with bolts normally retracted but projected by the depression of the related key; connections between said rock shafts arranged to operate them in unison; said connections including finger-actuating mechanism comprising horizontal arms and a cross bar pivoted at the extremities of said arms; means holding said crossbar in and returning the same to its normal relative position, with respect to said horizontal arms; said cross-bar adapted to engage, when depressed, with the projected bolts of said fingers, and to tilt on its pivots when, during its return movement, it strikes a projected bolt; a magnet element; a two-armed lever rigid on one of said shafts, adjustable stops located under the extremity of said two-armed lever, and means holding the latter in position; a yielding connection between one arm of said two-armed lever and said magnet element; stops arranged to limit the return movement of said fingers relatively to the normal or initial position of the cross-bars of the arms of said finger-actuating mechanism; a series of pivoted universal bails, one under each row of keys; means holding said universal bails in normal position; a make-and-break in circuit with the magnet element including fixed and movable contacts normally apart; and means between said universal bails and said movable contact whereby the depression of anyone of the former will move the latter to closed position.

2. In a device of the character described, the combination of a frame, a series of rockable shafts journaled therein; a bank of keys pivoted in the frame; a corresponding series of fingers provided with bolts normally retracted but projected by the depression of the related key; connections between said rock shafts arranged to operate them in unison; said connections including finger-actuating mechanism comprising horizontal arms and a cross bar pivoted at the extremities of said arms; means holding said cross-bar in and returning the same to its normal relative position, with respect to said horizontal arms; said cross-bar adapted to engage, when depressed, with the projected bolts of said fingers, and to tilt on its pivots when, during its return movement, it strikes a projected bolt; a magnet element; a two-armed lever rigid on one of said shafts, adjustable stops located under the extremity of said two-armed lever; and means holding the latter in position; a yielding connection between one arm of said two-armed lever and said magnet element; stops arranged to limit the return movement of said fingers relatively to the normal or initial position of the cross-bars of the arms of said finger-actuating mechanism; a series of pivoted universal bails, one under each row of keys; means holding said universal bails in normal position; a make-and-break in circuit with the magnet element including fixed and movable contacts normally apart; means between said universal bails and said movable contact whereby the depression of anyone of the former will move the latter to closed position; and means operated by the magnet element adapted to interrupt the circuit energizing the magnet the instant the latter has been energized and has acted.

3. In a device of the character described, the combination of a frame, a series of rockable shafts journaled therein; a bank of keys pivoted in the frame; a corresponding series of fingers provided with bolts normally retracted but projected by the depression of the related key; connections between said rock shafts arranged to operate them in unison; said connections including finger-actuating mechanism comprising horizontal arms and a cross bar pivoted at the extremities of said arms; means holding said cross-bar in and returning the same to its normal relative position, with respect to said horizontal arms; said cross-bar adapted to engage, when depressed, with the projected bolts of said fingers, and to tilt on its pivots when, during its return movement, it strikes a projected bolt; a magnet element; a two-armed lever rigid on one of said shafts, adjustable stops located under the extremity of said two-armed lever, and means holding the latter in position; a yielding connection between one arm of said two-armed lever and said magnet element; stops arranged to limit the return movement of said fingers relatively to the normal or initial position of the cross-bars of the arms of said finger-actuating mechanism; a series of pivoted universal bails, one under each row of keys; means holding said universal bails in normal position; a make-and-break in circuit with the magnet element including fixed and movable contacts normally apart; means between said universal bails and said movable contact whereby the depression of anyone of the former will move the latter to closed position; and one pole of the circuit connection of the magnet element including a switch normally closed, means carried by the movable part of said magnet element adapted to open said switch the instant the magnet element has been energized and has acted.

4. In a device of the character described, the combination of a frame, a series of rockable shafts journaled therein; a bank of keys pivoted in the frame; a corresponding series of fingers provided with bolts normally retracted but projected by the depression of the related key; connections between said rock shafts arranged to operate them in unison; said connections including finger-actuating mechanism comprising horizontal arms and a cross bar pivoted at the extremities of said arms; means holding said cross-bar in and returning the same to its normal relative position, with respect to said horizontal arms; said cross-bar adapted to engage, when depressed, with the projected bolts of said fingers, and to tilt on its pivots when, during its return movement, it strikes a projected bolt; a magnet element; a two-armed lever rigid on one of said shafts, adjustable stops located under the extremity of said two-armed lever, and means holding the latter in position; a yielding connection between one arm of said two-armed lever and said magnet element; stops arranged to limit the return movement of said fingers relatively to the normal or initial position of the cross-bars of the arms of said finger-actuating mechanism; a series of pivoted universal bails, one under each row of keys; means holding said universal bails in normal position; a make-and-break in circuit with the magnet element including fixed and movable contacts normally apart; means between said universal bails and said movable contact whereby the depression of anyone of the former will move the latter to closed position; and a shift key and means supplementary thereto whereby such shift key may be locked in its depressed position after having been operated.

5. In a device of the character described, the combination of a frame, a series of rockable shafts journaled therein; a bank of keys pivoted in the frame; a corresponding series of fingers provided with bolts normally retracted but projected by the depression of the related key; connections between said rock shafts arranged to operate them in unison; said connections including finger-actuating mechanism comprising horizontal arms and a cross bar pivoted at the extremities of said arms; means holding said cross-bar in and returning the same to its normal relative position, with respect to said horizontal arms; said cross-bar adapted to engage, when depressed, with the projected bolts of said fingers, and to tilt on its pivots when, during its return movement, it strikes a projected bolt; a magnet element; a two-armed lever rigid on one of said shafts, adjustable stops located under the extremity of said two-armed lever, and means holding the latter in position; a yielding connection between one arm of said two-armed lever and said magnet element; stops arranged to limit the return movement of said fingers relatively to the normal or initial position of the cross-bars of the arms of said finger-actuating mechanism; a series of pivoted universal bails, one under each row of keys; means holding said universal bails in normal position; a make-and-break in circuit with the magnet element including fixed and movable contacts normally apart; means between said universal bails and said movable contact whereby the depression of any one of the former will move the latter to closed position; one pole of the circuit connection of the magnet element including a switch normally closed, means carried by the movable part of said magnet element adapted to open said switch the instant the magnet element has been energized and has acted; and a shift key and means supplementary thereto whereby such shift key may be locked in its depressed position after having been operated.

6. In a device of the character described, the combination of a frame, a series of rockable shafts journaled therein; a bank of keys pivoted in the frame; a corresponding series of fingers provided with bolts normally retracted but projected by the depression of the related key; connections between said rock shafts arranged to operate them in unison; said connections including finger-actuating mechanism comprising horizontal arms and a spring-controlled cross-bar pivoted at the extremities of said arms; said cross-bar adapted to engage, when depressed, with the projected bolts of said fingers, and to tilt on its pivots when, during its return movement, it strikes a projected bolt; a magnet element; a two-armed lever rigid on one of said shafts, adjustable stops located under the extremity of said two-armed lever, and means holding the latter in position; a yielding connection between one arm of said two-armed lever and said magnet element; stops arranged to limit the return movement of said fingers relatively to the normal or initial position of the cross-bars of the arms of said finger-actuating mechanism; a series of pivoted universal bails, one under each row of keys; means holding said universal bails in normal position; a make-and-break in circuit with the magnet element including fixed and movable contacts normally apart; and means between said universal bails and said movable contact whereby the depression of any one of the former will move the latter to closed position.

7. In a device of the character described, the combination of a frame, a series of rockable shafts journaled therein; a bank of keys pivoted in the frame; a corresponding series of fingers provided with bolts normally retracted but projected by the depression of the related key; connections between said rock shafts arranged to operate them in unison; said connections including finger-actuating mechanism comprising horizontal arms and a spring-controlled cross-bar pivoted at the extremities of said arms; said cross-bar adapted to engage, when depressed, with the projected bolts of said fingers, and to tilt on its pivots when, during its return movement, it strikes a projected bolt; a two-armed lever rigid on one of said shafts, adjustable stops located under the extremity of said two-armed lever, and a spring holding the latter in position; a yielding connection between one arm of said two-armed lever and said magnet element; stops arranged to limit the return movement of said fingers relatively to the normal or initial position of the cross-bars of the arms of said finger-actuating mechanism; a series of pivoted universal bails, one under each row of keys; means holding said universal bails in normal position; a make-and-break in circuit with the magnet element including fixed and movable contacts normally apart; and means between said universal bails and said movable contact whereby the depression of any one of the former will move the latter to closed position.

8. In a device of the character described, the combination of a frame, a series of rockable shafts journaled therein; a bank of keys pivoted in the frame; a corresponding series of fingers provided with bolts normally retracted but projected by the depression of the related key; connections between said rock shafts arranged to operate them in unison; said connections including finger-actuating mechanism comprising horizontal arms and a cross-bar pivoted at the extremities of said arms; means holding said cross bar in and returning the same to its normal relative position, with respect to said horizontal arms; said cross-bar adapted to engage, when depressed, with the projected bolts of said fingers, and to tilt on its pivots when, during its return movement, it strikes a projected bolt; a magnet element; a two-armed lever rigid on one of said shafts, adjustable stops located under the extremity of said two-armed lever, and means holding the latter in position; a bell-crank mounted on one arm of said two-armed lever and connected with said magnet element; a stop and a spring controlling the movement of such bell-crank; stops arranged to limit the return movement of said fingers relatively to the normal or initial position of the cross-bars of the arms of said finger-actuating mechanism; a series of pivoted universal bails, one under each row of keys; means holding said universal bails in normal position; a make-and-break in circuit with the magnet element including fixed and movable contacts normally apart; and means between said universal bails and said movable contact whereby the depression of any one of the former will move the latter to closed position.

9. In a device of the character described, the combination of a frame, a series of rockable shafts journaled therein; a bank of keys pivoted in the frame; a corresponding series of fingers provided with bolts normally retracted but projected by the depression of the related key; connections between said rock shafts arranged to operate them in unison; said connections including finger-actuating mechanism comprising horizontal arms and a spring-controlled cross-bar pivoted at the extremities of said arms; said cross-bar adapted to engage, when depressed, with the projected bolts of said fingers, and to tilt on its pivots when, during its return movement, it strikes a projected bolt; a magnet element; a two-armed lever rigid on one of said shafts, adjustable stops located under the extremity of said two-armed lever, and a spring holding the latter in position; a yielding connection between one arm of said two-armed lever and said magnet element; stops arranged to limit the return movement of said fingers relatively to the normal or initial position of the cross-bars of the arms of said finger-actuating mechanism; a series of pivoted universal bails, one under each row of keys; means holding said universal bails in normal position; a make-and-break in circuit with the magnet element including fixed and movable contacts normally apart; arms on the axis of said universal bails; and means operated by said arms whereby the depression of any one of the universal bails will move said contacts of the make-and-break together.

10. In a device of the character described, the combination of a frame, a series of rockable shafts journaled therein; a bank of keys pivoted in the frame; a corresponding series of fingers provided with bolts normally retracted but projected by the depression of the related key; connections between said rock shafts arranged to operate them in unison; said connections including finger-actuating mechanism comprising horizontal arms and a spring-controlled cross-bar pivoted at the xtremities of said arms; said cross-bar adapted to engage, when depressed, with the projected bolts of said fingers, and to tilt on its pivots when during its return movement, it strikes a projected bolt; a magnet element; a two-armed lever rigid on one of said shafts, adjustable stops located under the extremity of said two-armed lever, and a spring holding the latter in position; a bell-crank mounted on one arm of said two-armed lever and connected with said magnet element; a stop and a spring controlling the movement of such bell-crank; stops arranged to limit the return movement of said fingers relatively to the normal or initial position of the cross-bars of the arms of said finger-actuating mechanism; a series of pivoted universal bails, one under each row of keys; means holding said universal bails in normal position; a make-and-break in circuit with the magnet element including fixed and movable contacts normally apart; and means between said universal bails and said movable contact whereby the depression of any one of the former will move the latter to closed position.

11. In a device of the character described, the combination of a frame, a series of rockable shafts journaled therein; a bank of keys pivoted in the frame; a corresponding series of fingers provided with bolts normally retracted but projected by the depression of the related key; connections between said rock shafts arranged to operate them in unison; said connections including finger-actuating mechanism comprising horizontal arms and a spring-controlled cross-bar pivoted at the extremities of said arms; said cross-bar adapted to engage, when depressed, with the projected bolts of said fingers, and to tilt on its pivots when during its return movement, it strikes a projected bolt; a magnet element; a two-armed lever rigid on one of said shafts, adjustable stops located under the extremity of said two-armed lever, and means holding the latter in position; a yielding connection between one arm of said two-armed lever and said magnet element; stops arranged to limit the return movement of said fingers relatively to the normal or initial position of the cross-bars of the arms of said finger-actuating mechanism; a series of pivoted universal bails, one under each row of keys; means holding said universal bails in normal position; a make-and-break in circuit with the magnet element including fixed and movable contacts normally apart; and means between said universal bails and said movable contact whereby the depression of any one of the former will move the latter to closed position; and one pole of the circuit connection of the magnet element including a switch normally closed, means carried by the movable part of said magnet element adapted to open said switch the instant the magnet element has been energized and has acted.

12. In a device of the character described, the combination of a frame, a series of rockable shafts journaled therein; a bank of keys pivoted in the frame; a corresponding series of fingers provided with bolts normally retracted but projected by the depression of the related key; connections between said rock shafts arranged to operate them in unison; said connections including finger-actuating mechanism comprising horizontal arms and a spring-controlled cross-bar pivoted at the extremities of said arms; said cross-bar adapted to engage, when depressed, with the projected bolts of said fingers, and to tilt on its pivots when during its return movement, it strikes a projected bolt; a magnet element; a two-armed lever rigid on one of said shafts, adjustable stops located under the extremity of said two-armed lever, and a spring holding the latter in position; a yielding connection between one arm of said two-armed lever and said magnet element; stops arranged to limit the return movement of said fingers relatively to the normal or initial position of the cross-bars of the arms of said finger-actuating mechanism; a series of pivoted universal bails, one under each row of keys; means holding said universal bails in normal position; a make-and-break in circuit with the magnet element including fixed and movable contacts normally apart; and means between said universal bails and said movable contact whereby the depression of any one of the former will move the latter to closed position; one pole of the circuit connection of the magnet element including a switch normally closed, means carried by the movable part of said magnet element adapted to open said switch the instant the magnet element has been energized and has acted; and a shift key and means supplementary thereto whereby such shift key may be locked in its depressed position after having been operated.

13. In a device of the character described, in combination with a bank of keys including a shift key, the fingers related to said keys, and the mechanism actuating such fingers; a pendent member on the finger operated by the shift key, a spring-controlled shouldered stem sliding in said pendent member; and a device of the lever type supplementary to and operated by the shift key, whereby the finger of the shift key, when operated, may be held depressed after the shift key has been released.

14. In a device of the character described, in combination with a bank of keys including a shift key, the fingers related to said keys, and the mechanism actuating such fingers; a pendent member on the finger operated by the shift key, a spring-controlled shouldered stem sliding in said pendent member; and a spring-controlled device of the lever type supplementary to and operated by the shift key, whereby the finger of the shift key, when operated, may be held depressed after the shift key has been released.

15. In a device of the character described, in combination with a bank of keys including a shift-key, the fingers related to said keys, and the mechanism actuating such fingers; means supplementary to the shift key whereby the finger of the shift key, when operated, may be held depressed after the shift key has been released; and means to temporarily lock the supplementary shift key in depressed position.

16. In a device of the character described, in combination with a bank of keys including a shift-key, the fingers related to said keys, and the mechanism actuating such fingers; a pendent member on the finger operated by the shift-key, a spring-controlled shouldered stem sliding in said pendent member; a device of the lever type supplementary to and operated by the shift key, whereby the finger of the shift key, when operated, may be held depressed after the shift key has been released; and means to temporarily lock the supplementary shift key in depressed position.

17. The combination of the power element and connections, fingers provided with projectable bolts, a finger-actuating mechanism comprising pivoted arms operated by said power element, a connecting cross-bar pivoted at the extremities of the arms and adapted to engage with the projected bolts of said fingers; and means holding said cross-bar in and returning it to its normal position, but permitting said cross-bar to tilt on its pivots when, during its return movement, it strikes a projected bolt.

18. The combination of the power element and connections, fingers provided with projectable bolts, a finger-actuating mechanism comprising pivoted arms operated by said power element, a cross-bar connecting the extremities of said arms and adapted to engage with the projected bolts of said fingers; means holding said cross-bar in and returning it to its normal position, but permitting said cross-bar to tilt on its pivots when, during its return movement, it strikes a projected bolt; and a stop arranged to limit the return movement of the fingers relatively to the normal or initial position of said cross-bar.

GUSTAVUS A. WIKANDER.

Witnesses:
C. B. LONG,
O. O. MARTIN.